United States Patent
Chan et al.

(10) Patent No.: US 8,434,079 B2
(45) Date of Patent: *Apr. 30, 2013

(54) PREPARATION FOR SOFTWARE ON DEMAND SYSTEM

(75) Inventors: Hon Keat W. Chan, Bellevue, WA (US); Andrew J. Edwards, Bellevue, WA (US); David Gillies, Bellevue, WA (US); Carlos P. Gomes, Redmond, WA (US); Jiyang Liu, Sammamish, WA (US); Patrick L. McDonald, Seattle, WA (US); Mark L. Roberts, Bellevue, WA (US); Hoi Vo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1256 days.

This patent is subject to a terminal disclaimer.

(21) Appl. No.: 11/757,929

(22) Filed: Jun. 4, 2007

(65) Prior Publication Data

US 2008/0034346 A1 Feb. 7, 2008

Related U.S. Application Data

(63) Continuation of application No. 10/146,635, filed on May 14, 2002, now Pat. No. 7,228,540.

(51) Int. Cl.
*G06F 9/44* (2006.01)

(52) U.S. Cl.
USPC .......................................................... 717/173

(58) Field of Classification Search .......... 717/114–119, 717/127, 131, 168–178
See application file for complete search history.

(56) References Cited

U.S. PATENT DOCUMENTS

| | | | |
|---|---|---|---|
| 6,427,234 B1 | 7/2002 | Chambers et al. | |
| 6,604,236 B1 | 8/2003 | Draper et al. | |
| 6,662,354 B1 | 12/2003 | Krablin et al. | |
| 2002/0083413 A1 | 6/2002 | Kodusky et al. | |
| 2002/0147972 A1 | 10/2002 | Olmeda et al. | |
| 2003/0056200 A1 | 3/2003 | Li et al. | |
| 2004/0003266 A1 | 1/2004 | Moshir et al. | |

OTHER PUBLICATIONS

Markus Hof, "Late Adaptation of Method Invocation Semantics", 2000, Springer-Verlag Berlin Heidelberg, pp. 396-401.*
Markus Hof, "Late Adaptation of Method Invocation Semantics—Regular Talk", retrieved 2010, CiteSeerX, 6 pages.*
Hayton et al., "FlexiNet—A Flexible component oriented middleware system", 1998, ACM. pp. 17-24.*
Bromling et al., "Pattern-based Parallel Programming", Feb. 2002, CiteSeerX, pp. 1-22.*

* cited by examiner

*Primary Examiner* — Ted T Vo
(74) *Attorney, Agent, or Firm* — Merchant & Gould PC

(57) ABSTRACT

A method prepares a computer program for operation in a computer supply system that supplies portions, or program units, of program code or program data of the computer program as the program needs the portions. The method includes defining a program unit of the program and removing the program unit from the program, thereby producing a program skeleton that is missing the program unit. The method further includes inserting instructions in place of the program unit in the program skeleton. The instructions are operative to request the program unit when the program skeleton encounters the instructions. An information structure includes a program skeleton of a program. The program skeleton is missing a funclet of the program, but includes a placeholder in place of the funclet. The program skeleton additionally includes instructions in place of the funclet. The instructions are operative to request the funclet when the program skeleton encounters the instructions.

20 Claims, 12 Drawing Sheets

PREPARATION FOR SOFTWARE ON DEMAND SYSTEM

RELATED APPLICATIONS

This application is a continuation of prior U.S. patent application Ser. No. 10/146,635, entitled "Preparation for Software on Demand System," filed May 14, 2002, now U.S. Pat. No. 7,228,540, which is issued on Jun. 5, 2007, which is incorporated herein by reference in its entirety.

TECHNICAL FIELD

This application relates generally to software systems and more particularly to a software system for loading software on demand.

BACKGROUND OF THE INVENTION

Computer systems often involve downloading applications and data from a server system for use on a client system. The applications or data may be downloaded only once and then stored on the client computer or they may be downloaded each time the application or data is used. In present application download systems, the client computer initiates a launch mechanism for a desired application, and the compressed bits for the entire application are streamed down from the server and onto the client system. The bits are then decompressed, installed, and executed. Such systems allow no overlap between download time and the execution. The client computer waits until the entire application has been downloaded before beginning execution of the program. Also, a client computer utilizes only about twenty percent of an application's total size during a typical user scenario. Thus, about eighty percent of the downloaded application code and data is unnecessary. While applications are typically cached after they are initially downloaded, the first time download wastes significant bandwidth resources. Also, the time for starting up many applications is extremely long for clients without high-speed connections to servers.

Some systems have used a process called paging, in which an application is split into pages of equal size and each page is downloaded as it is needed by the application. However, such systems often require download of code and/or data that is unnecessary because it happens to be on the same page as the requested code or data. This again wastes bandwidth resources and time. It may also have adverse effects on the operation of the application because the downloaded pages are not arranged in a logical manner.

SUMMARY OF THE INVENTION

In accordance with the present invention, the above and other problems are solved by supplying portions of program code or program data of a computer program as the portions are needed by the program. The portions are defined in accordance with the logic of the computer program. The portions are then removed from the computer program to produce an application skeleton. Rather than downloading and running the entire program on a computing system, the computing system runs the smaller program skeleton. The computing system generally downloads the portions of the computer program and inserts them into the skeleton, as they are needed.

In accordance with other aspects, the present invention relates to a method of preparing a computer program for operation in a computer supply system that supplies portions, or program units, of program code or program data of the computer program as the program needs the portions. The method includes defining a program unit of the program and removing the program unit from the program, thereby producing a program skeleton that is missing the program unit. The method further includes inserting instructions in place of the program unit in the program skeleton. The instructions are operative to request the program unit when the program skeleton encounters the instructions.

In accordance with still other aspects, the present invention relates to an information structure stored on a computer-readable medium. The information structure includes a program skeleton of a program. The program skeleton is missing a funclet of the program, but includes a placeholder in place of the funclet. The program skeleton additionally includes instructions in place of the funclet. The instructions are operative to request the funclet when the program skeleton encounters the instructions.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

An embodiment of the present invention separates portions of operational code or data of a computer program to be downloaded into program units referred to herein as "funclets." Funclets are preferably defined in accordance with the logic of a particular program so as to avoid downloading unneeded code or data and to optimize the performance of the program on the client system. Rather than downloading an entire program from a server system to a client system, a program skeleton is downloaded and the funclets from the program are downloaded as they are needed by the program, as described below.

Figure 1:
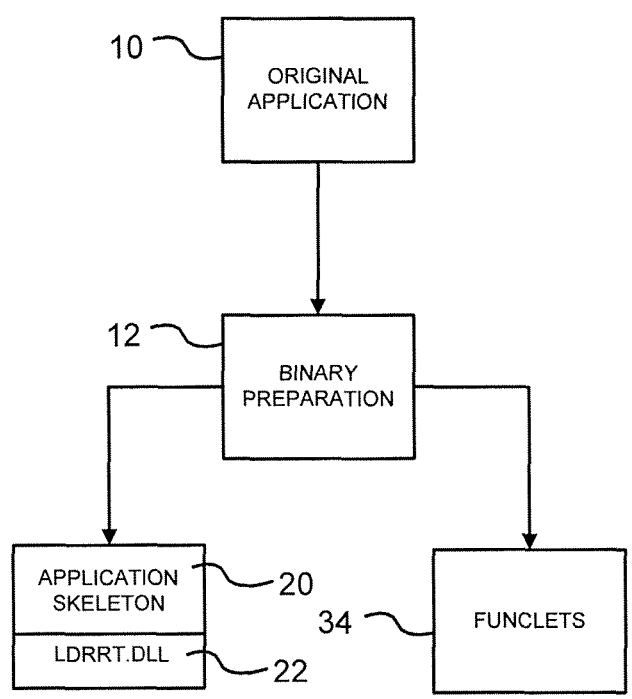
FIG. 1 illustrates an operational flow for preparing an application for use with a loading process according to an embodiment of the present invention.

Referring now to FIG. 1, before an application program is used with a software on demand system, an original application 10 is processed in a binary preparation operation 12. The binary preparation operation 12 receives the original application 10 and yields an application skeleton 20 and funclets 34, all corresponding to the original application 10. The application skeleton 20 is based on the original application 10, but is missing the funclets 34. The computing system runs the application skeleton 20 and uses an LDRRT (loader run time) module to get the funclets 34 as they are needed by the application skeleton 20. Running the application skeleton 20 and downloading the funclets 34 is described in more detail in U.S. patent application Ser. No. 10/146,611 entitled "Software on Demand System," which is filed on even date with the present application and is incorporated herein by reference. The funclets 34 are preferably defined in accordance with the logic of the original application 10, as described more fully below.

Figure 2:
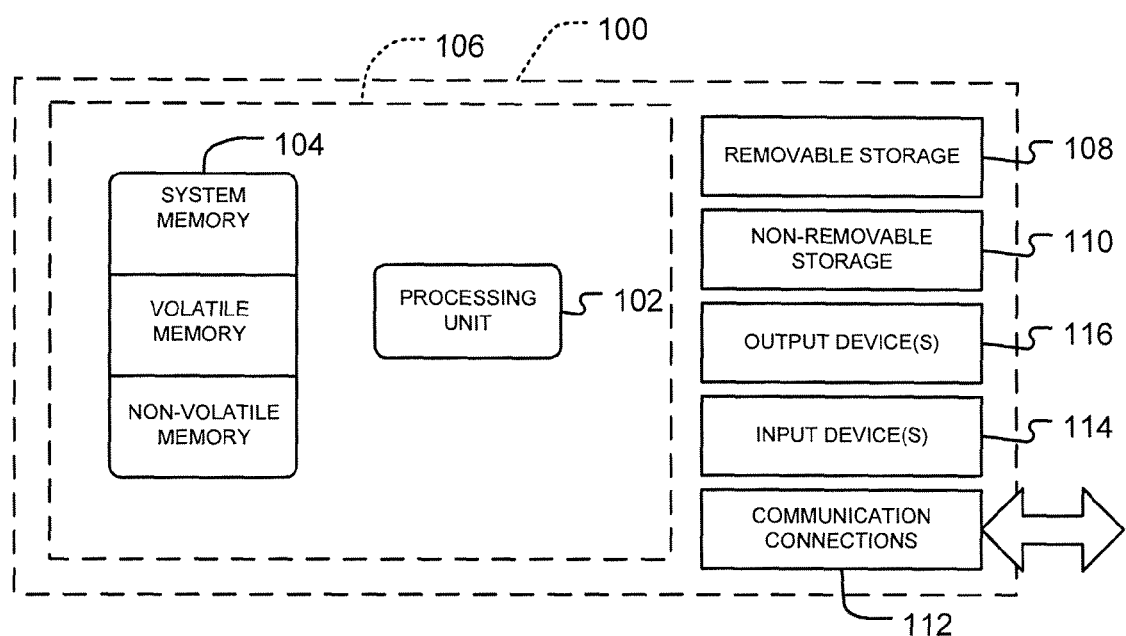
FIG. 2 illustrates a computing system, such as a system that can be used for the preparation operation of FIG. 1.

Computer systems such as a computer system 100 shown in FIG. 2 may be used to perform the binary preparation operation 12, to run the application skeleton 20, and to download the funclets 34. In its most basic configuration, computing system 100 is illustrated in FIG. 2 by dashed line 106 encompassing the processor 102 and the memory 104. Additionally, system 100 may also include additional storage (removable and/or non-removable) including, but not limited to, magnetic or optical disks or tape. Such additional storage is illustrated in FIG. 2 by removable storage 108 and non-removable storage 110. Computer storage media, such as memory 104, removable storage 108 or non-removable storage 110 includes volatile and nonvolatile, removable and non-removable media implemented in any method or technology for storage of information such as computer readable instructions, information or data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by system 100. Any such computer storage media may be part of system 100. Depending on the configuration and type of computing device, memory 104 may be volatile, non-volatile or some combination of the two.

System 100 may also contain communications connection(s) 112 that allow the device to communicate with other devices. Additionally, system 100 may have input device(s) 114 such as a keyboard, mouse, pen, voice input device, touch input device, etc. Output device(s) 116 such as a display, speakers, printer, etc. may also be included. All these devices are well known in the art and need not be discussed at length here.

Computer system 100 typically includes at least some form of computer readable media. Computer readable media can be any available media that can be accessed by system 100. By way of example, and not limitation, computer readable media may comprise computer storage media and communication media. Communication media typically embodies computer readable instructions, information or data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Figure 3:
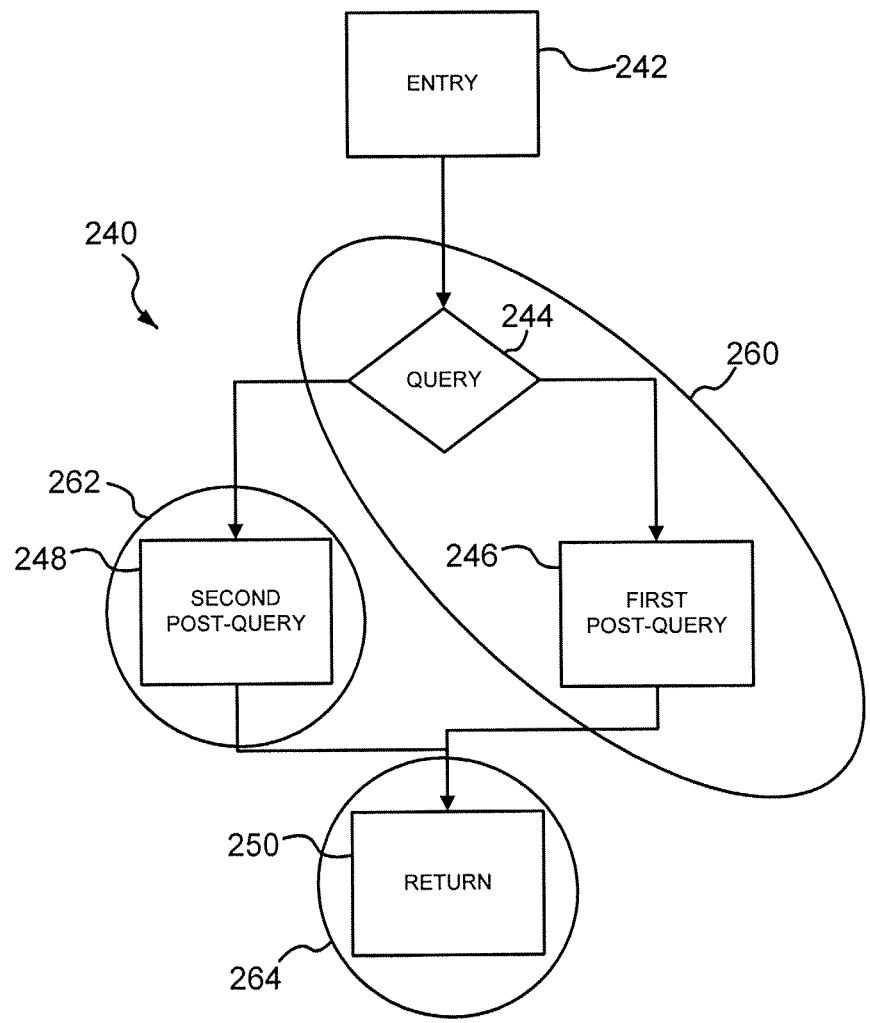
FIG. 3 illustrates a portion of an application, showing how that portion could be divided into funclets according to an embodiment of the present invention.

Each funclet 34 preferably has only a single entry point so that each funclet will have only a single corresponding binary stub. However, each funclet 34 may have multiple exit points, and in some situations it may be preferable for funclets to have multiple entry points, for example to facilitate making larger funclets. FIG. 3 illustrates a portion 240 of the process flow of the original application 10. An entry operation 242 calls a query operation 244, such as an "IF" operation. The query operation 244 may call either a first post-query operation 246 or a second post-query operation 248. Upon completion, the active post-query operation 246, 248 calls a common return operation 250. As is shown, the query operation 244 and the first post-query operation 246 may be combined into a first funclet 260 because it is highly likely that entry into the query operation 244 will result in a call to the first post-query operation 246 based on the logic of the application 10. The second post-query operation 248 defines a second funclet 262, and the return operation 250 defines a third funclet 264. By thus defining the funclets according to the process flow of the original application 10, the downloading of unnecessary data or code is minimized. Note that the second post-query operation 248 and the return operation 250 would preferably not be included in a single funclet because the resulting funclet would have two entry points (one from the query operation 244 into the second post-query operation 248 and another from the first post-query operation 248 into the return operation 250). More specific operations for thus defining funclets are described in more detail below.

Figure 4:
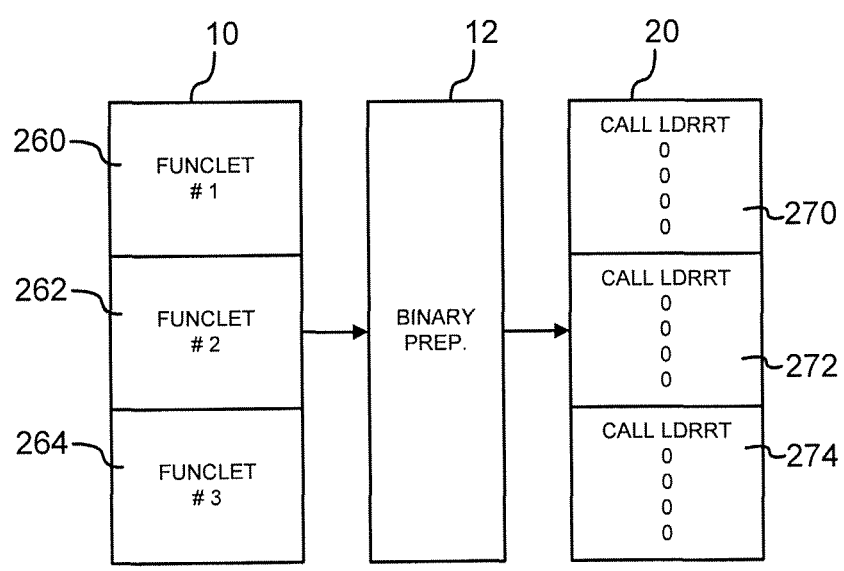
FIG. 4 illustrates an operational flow of three funclet divisions of an original program and the corresponding features of the resulting program skeleton.

Referring now to FIG. 4, the original application 10 includes the first funclet 260, the second funclet 262, and the third funclet 264. The binary preparation operation 12 yields the application skeleton 20, which is stored in an information structure on a computer readable medium. Specifically, the binary preparation operation 12 replaces the first funclet 260, the second funclet 262, and the third funclet 264 from the original application 230 with a first binary stub 270, a second binary stub 272, and a third binary stub 274, respectively. In a preferred embodiment, each binary stub 270, 272, 274 includes a call to the LDRRT module and a placeholder, which preferably includes unused space filled with zeros to replace the missing funclet 260, 262, 264, respectively.

Figure 5:
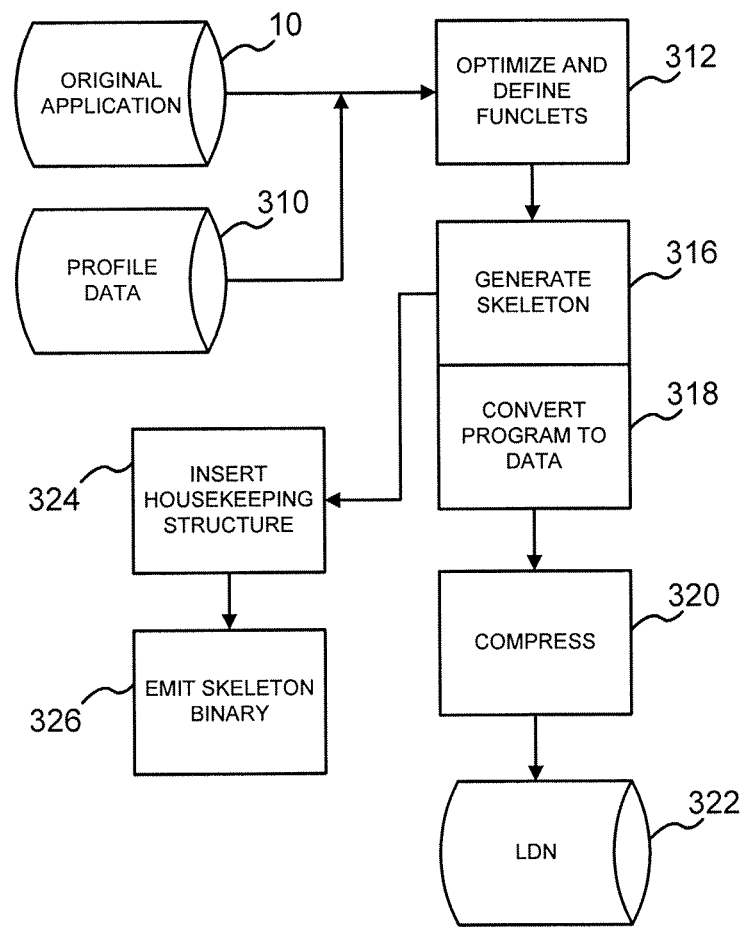
FIG. 5 illustrates an operational flow for preparing an application for use with a loading process according to an embodiment of the present invention.

Referring now to FIG. 5, the operational flow of the binary preparation operation 12 will be described in more detail. The original application 10 and profile data 310 are input into an optimize and define funclets operation 312. The profile data 310 includes information regarding the operation of the original application 10. The profile data 310 is preferably compiled by monitoring the operation of the original application 10 during several user sequences that are designed to simulate the typical use of the original application 10 by end users. Included within the profile data 310 is information regarding the frequency with which particular blocks of code or data are used during a typical user scenario. The optimize and define funclets operation 312 preferably determines an optimum configuration of the application for use in a software on demand system. Among other things, the optimize and define funclets operation 312 defines the funclets 34. The optimize and define funclets operation 312 will be described in more detail below.

In a preferred embodiment, a generate skeleton operation 316 produces the basic structure of the application skeleton 20, while a convert program to data operation 318 produces the funclets 34. Both the generate skeleton operation 316 and the convert program to data operation 318 operate in accordance with the configuration determinations made by the optimize and define funclets operation 312, as described below.

The funclets 34 that are output from the convert program to data operation 318 are preferably compressed by compress operation 320. The compression and decompression of the funclets 34 is described in more detail in U.S. patent application Ser. No. 08/783,491 entitled "Temporally Ordered Binary Search Method and System," which is filed on even date with the present application and is incorporated herein by reference. The compressed funclets 34 are placed in an LDN (Loader.net) file or storage space 322, preferably on a server computer system.

The basic structure of the application skeleton 20 is output from the generate skeleton operation 316 to the insert housekeeping structure operation 324, which places housekeeping structure and a link to the LDRRT module in the application skeleton 20. The housekeeping structure and the LDRRT link allow the application skeleton 20 to properly communicate with the LDRRT module and request the funclets 34 as they are needed. An emit skeleton binary operation 326 then formats the application skeleton 20 so that it is executable by a computer operating system. Preferably, the application skeleton 20 and the LDRRT module are then supplied to a client computer system.

Figure 6:
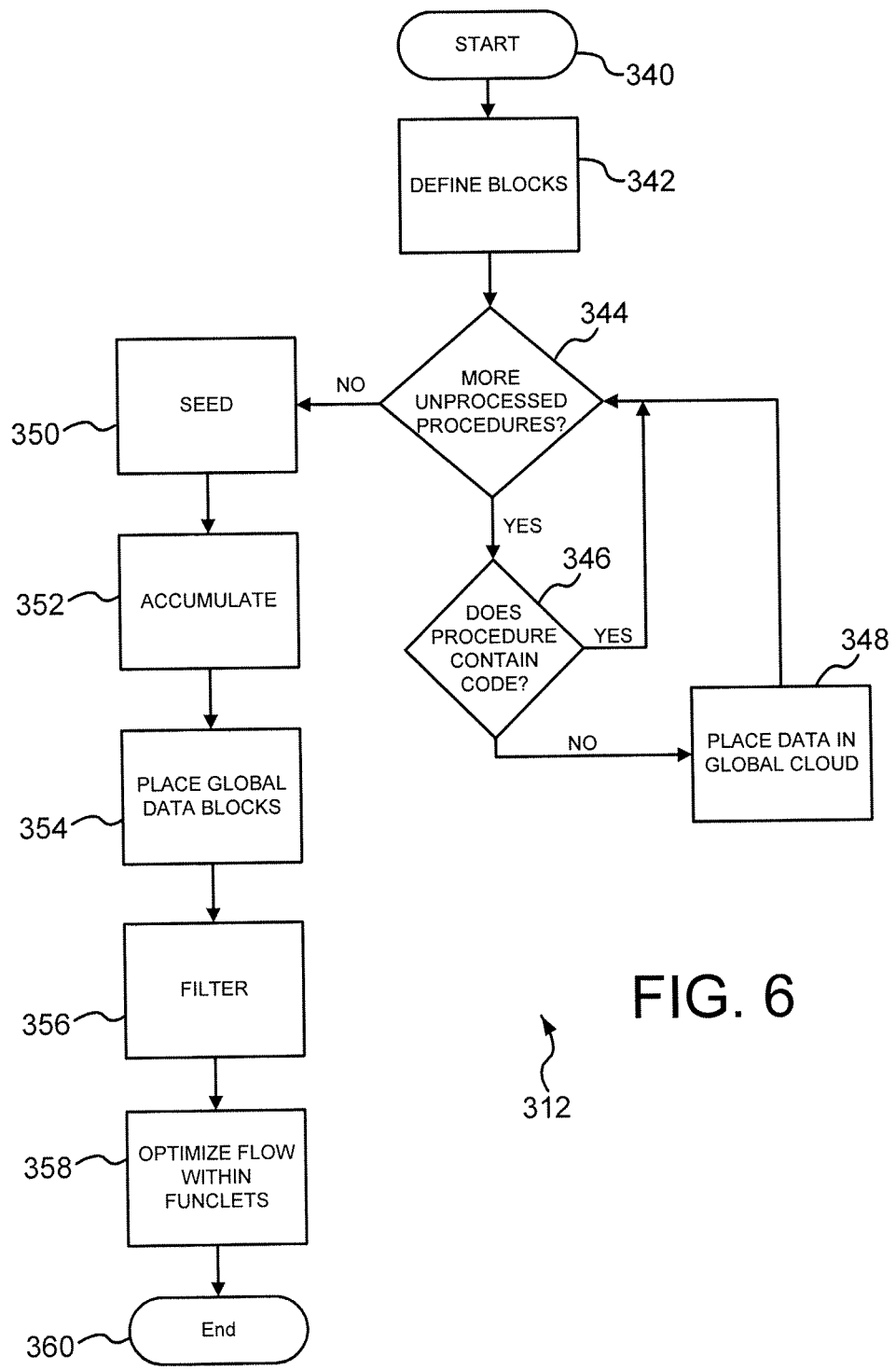
FIG. 6 illustrates the optimize and define funclets operation of FIG. 5 in more detail.

Referring now to FIG. 6, the optimize and define funclets operation 312 from FIG. 5 will be described in more detail. Upon beginning the operation at start 340, a define blocks operation 342 defines procedure blocks and data blocks of the original application 10. Each procedure block preferably includes a single entry point and a single exit point. The data blocks each preferably include a natural data group, such as an integer, an alphanumeric structure or an array of structures. An unprocessed procedures query operation 344 determines whether more procedure blocks remain to be processed by a procedure contain code query operation 346. If the unprocessed procedures query operation 344 determines that procedure blocks remain to be processed, then the procedure contain code query operation 346 pulls a procedure block and determines whether it contains any code. If the procedure block is determined to contain no code, then it is deemed a data block and is inserted with other data blocks in a place data in global data cloud operation 348. The unprocessed procedures query operation 344 then determines again whether any unprocessed procedures remain.

Once all procedure blocks are processed by the procedure contain code query 346, the unprocessed procedures query operation 344 determines that no unprocessed procedures remain. A seed operation 350 then defines certain procedure blocks as funclets or seeds, as will be described in more detail below. An accumulate operation 352 then adds to the funclets defined in the seed operation 350 by inserting more procedure blocks within the funclets and by defining more procedure blocks as new funclets. A place global data block 354 places data blocks in funclets that have already been defined and defines data blocks as new funclets. In filter operation 356, certain funclets are removed from the list of funclets if they do not meet predetermined requirements. With the funclets defined, the optimize flow within funclets operation 358 defines an arrangement of data blocks within each funclet that will optimize performance within the funclet. The optimize and define funclets operation 312 terminates at end operation 360.

Figure 7:
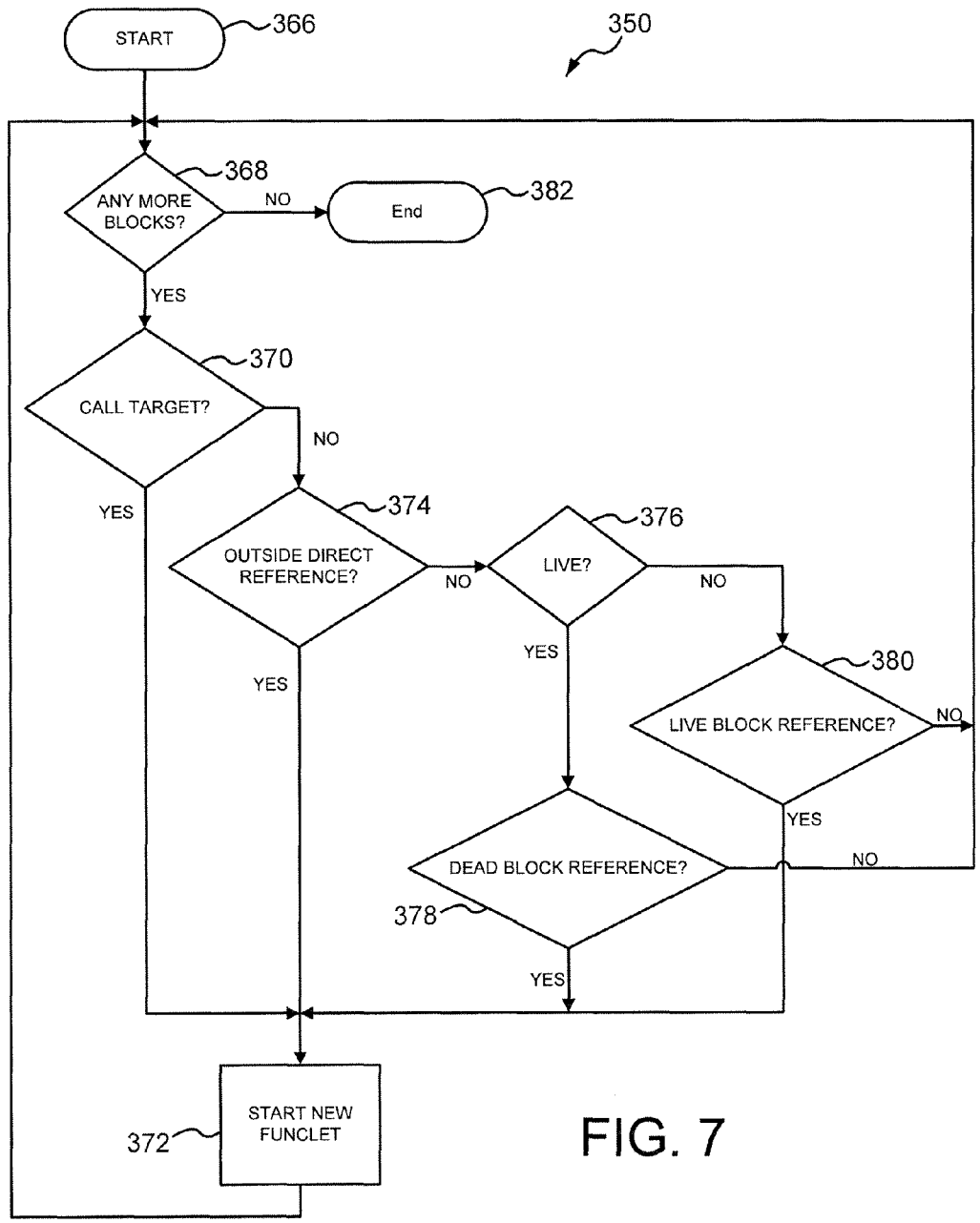
FIG. 7 illustrates the seed operation of FIG. 6 in more detail.

Referring to FIG. 7, the seed operation 350 from FIG. 6 begins at start operation 366 and the more blocks query operation 368 determines whether any procedure blocks remain that have not been processed by the seed operation 350. If more blocks remain, a call target query operation 370 pulls the highest priority unprocessed block and determines whether that block is a call target of another procedure. Priority of blocks is determined by the most heavily favored path through the original application 10, as indicated by the profile data 310. Thus, the highest priority block is the one most frequently encountered during the user scenarios that produced the profile data 310, and the lowest priority block is the one least frequently encountered during the user scenarios that produced the profile data 310. Thus, more frequently encountered blocks are preferably processed before less frequently encountered blocks.

If the call target query operation 370 determines that the block is a call target of another procedure, then start new funclet operation 372 defines a new funclet with the block. In other words, a new funclet is defined that initially includes only the block that was determined to be a call target. If the call target query operation 370 determines that the block is not a call target of another procedure, then an outside direct reference query operation 374 determines whether the block is directly referenced from outside that block's parent procedure. If the direct reference query operation 374 determines that the block is directly referenced from outside the parent procedure, then start new funclet operation 372 defines a new funclet with the block. Thus, all blocks that are either call targets of another procedure or that are directly referenced by outside the parent procedure are defined as funclets or seeds in start new funclet operation 372.

If the outside direct reference query operation 374 determines that the block is not directly referenced from outside the parent procedure, then live query operation 376 determines whether the block is dynamically live or dynamically dead, as indicated by the profile data 310. A dynamically dead block is a block that is substantially likely to never be needed by the application skeleton 20 during operation. In a preferred embodiment, a dynamically dead block is one that was not encountered during the user scenarios that produced the profile data 310. A dynamically live block is simply a block that is not dynamically dead.

If the live query operation 376 determines that the block is dynamically live, a dead block reference query operation 378 determines whether the dynamically live block is referenced from a dynamically dead block. If the dynamically live block is referenced from a dynamically dead block, then the start new funclet operation 372 defines the live block as a new funclet. If the dynamically live block is not referenced from a dynamically dead block, then the block is not defined as a funclet in seed operation 350 and the more blocks query operation 368 determines whether any blocks remain to be processed by the seed operation 350.

If the live query operation 376 determines that the block is dynamically dead, a live block reference query operation 380 determines whether the dynamically dead block is referenced from a dynamically live block. If the dynamically dead block is referenced from a dynamically live block, then the start new funclet operation 372 defines the dead block as a new funclet. If the dynamically dead block is not referenced from a dynamically live block, then the block is not defined as a funclet in seed operation 350 and the more blocks query operation 368 determines whether any blocks remain to be processed by the seed operation 350.

Thus, the seed operation 350 defines a block as a new funclet in start new funclet operation 372 if the block is either a dynamically live block referenced by a dynamically dead block or a dynamically dead block referenced by a dynamically live block. In this way, the optimize and define funclets operation 312 is able to separate dynamically live blocks and dynamically dead blocks into separate funclets. This is typically desirable because it is highly unlikely that the dynamically dead blocks would ever need to be downloaded. Note that in some situations, such as where a dynamically dead block is very small and cannot be combined with other dynamically dead blocks into a funclet, it may be desirable to combine dynamically live and dead blocks into a single funclet.

After all blocks have been processed by the seed operation 350, the more blocks query operation 368 determines that no more blocks remain to be processed, and end operation 382 terminates the seed operation 350.

Figure 8:
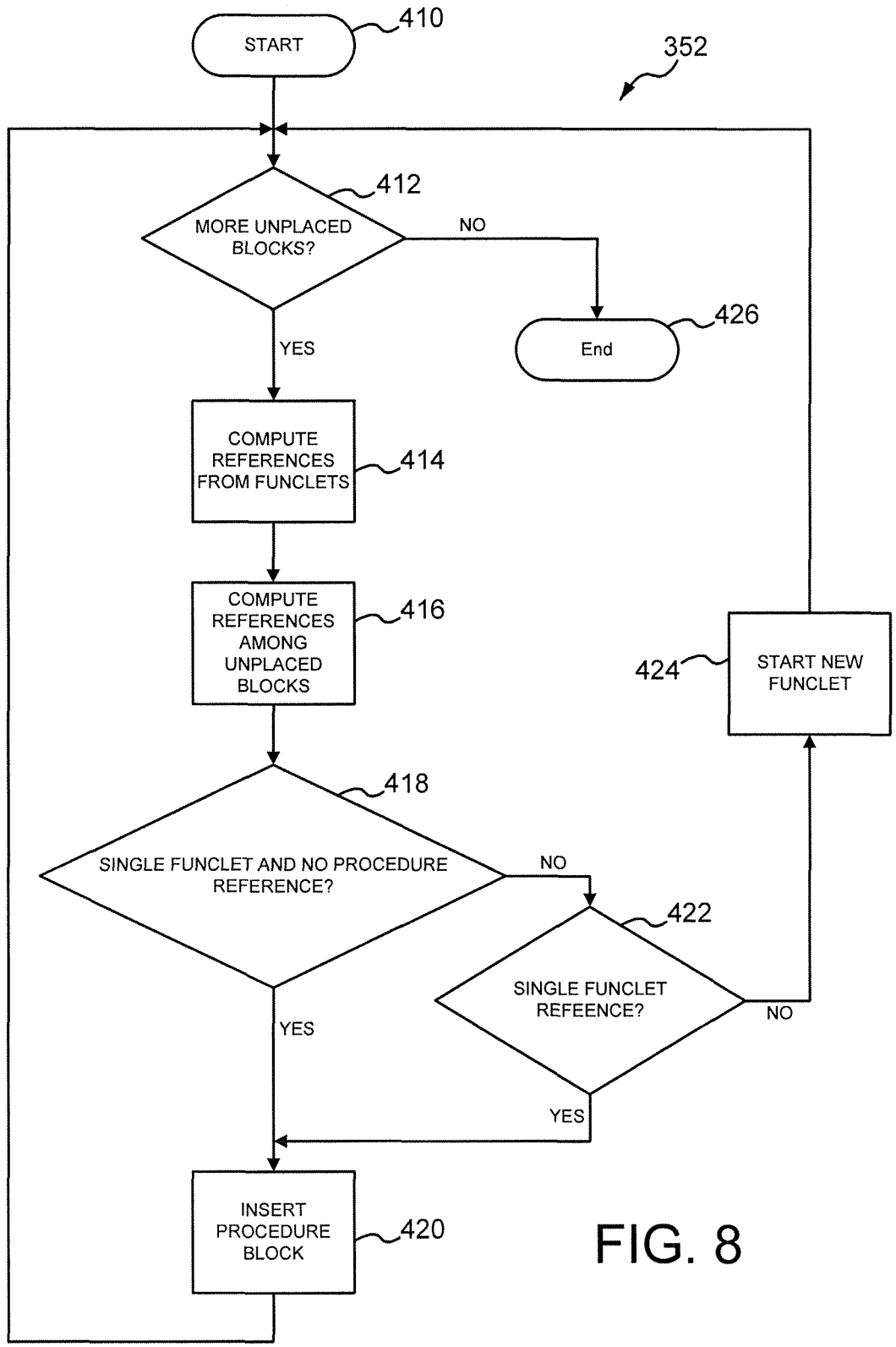
FIG. 8 illustrates the accumulate operation of FIG. 6 in more detail.

Referring now to FIG. 8, after the seed operation 350 is complete, the accumulate operation 352 from FIG. 6 begins at start operation 410. A more unplaced blocks query operation 412 determines whether any procedure blocks remain to be placed into funclets by the accumulate operation 352. If the more unplaced blocks query operation 412 determines that more blocks remain to be processed by the accumulate operation 352, then a compute references from funclets operation 414 computes the references from existing funclets to the remaining unplaced blocks. Additionally, a compute references among unplaced blocks operation 416 computes the references between the remaining unplaced blocks. A single-funclet-and-no-procedure-reference query operation 418 then determines whether any unplaced blocks are referenced by exactly one funclet and are not referenced by any other unplaced blocks. If at least one unplaced block is referenced by only one funclet and no other unplaced blocks, then the insert procedure block operation 420 includes the highest priority block that meets this criteria in the definition of the funclet that references the block.

By inserting such referenced blocks, the funclets can include several blocks and still have only one entry point into the funclet. It is desirable to have larger funclets because larger funclets can be more effectively compressed and downloaded. However, it is desirable to have each funclet include only a single entry point so that each funclet will have only one corresponding binary stub. This improves the performance of the application when running the application skeleton 20. This is illustrated by the funclet 260 in FIG. 3, which includes the query operation or block 244 and the first post-query operation or block 246. Note that if the query operation 244 alone were an existing funclet, then the first post-query operation 246 would be an unplaced block that was referenced by only one funclet and no other unplaced blocks. By including such a block in the funclet, the resulting funclet 260 still includes only a single entry point.

Referring back to FIG. 8, if no unplaced blocks are referenced by only one funclet and no other unplaced blocks, then a single funclet reference query operation 422 determines whether the highest priority unplaced block is referenced by only one funclet. If the highest priority unplaced block is referenced by only one funclet, even if it is also referenced by other unplaced blocks, then that highest priority block is included within the definition of the referencing funclet in the insert procedure block operation 420. Note that this may produce a funclet having more than one entry point because the resulting funclet will have an existing funclet entry point and will also have an entry point into the newly inserted block. However, the benefits of creating larger funclets in this manner have been found to generally outweigh the drawbacks of the rare multiple entry point funclets that may be created. In fact, in some situations multiple entry point funclets may be more desirable than single entry point funclets.

If no unplaced blocks are referenced by only one funclet as determined by the single funclet reference query operation 422, then start new funclet operation 424 defines the highest priority unplaced block as a new funclet. After a block is included in the definition of an existing funclet in the insert procedure block operation 420 or a new funclet is defined in the start new funclet operation 424, the unplaced blocks query operation 412 again determines whether any procedure blocks remain to be placed in funclets by the accumulate operation 352.

Thus, the accumulate operation 352 places all procedure blocks in funclets by either placing them in existing funclets or by defining them as new funclets.

Figure 9:
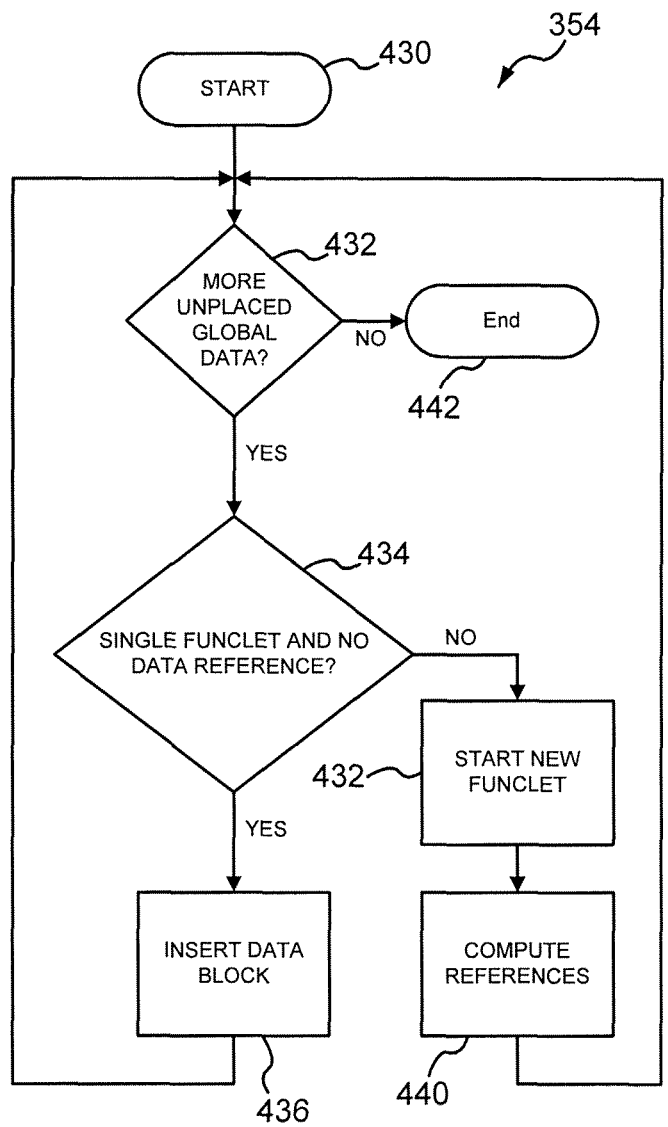
FIG. 9 illustrates the place global data blocks operation of FIG. 6 in more detail.

Referring now to FIG. 9, the place global data blocks operation 354 begins at a start operation 430. A more unplaced global data query 432 determines whether any unplaced blocks of global data or data blocks (i.e., blocks that contain data and no code) remain. If unplaced data blocks remain, then a single funclet and no data reference query operation 434 determines whether any unplaced data blocks are referenced by exactly one funclet and are not referenced by any unplaced data blocks.

If at least one unplaced data block is referenced by exactly one funclet and no unplaced data blocks, then the insert data block operation 436 includes the highest priority unplaced data block within the funclet referencing that data block.

If the single-funclet-and-no-data-reference query operation 434 determines that no unplaced data blocks are referenced by only one funclet and are not referenced by any unplaced data blocks, then the start new funclet operation 438 defines the highest priority unplaced data block as a new funclet. A compute references operation 440 then computes the references from the funclets to any remaining unplaced data blocks.

After the insert data block operation 436 or the compute references operation 440, the unplaced global data query operation 432 again determines whether any unplaced data blocks remain. After all data blocks have been included within funclet definitions, the unplaced global data query operation 432 determines that no unplaced data blocks remain and end operation 442 terminates the place global data blocks operation 354. Thus, the place global data blocks operation 354 includes all data blocks within funclet definitions by either including them within existing funclets or by defining them as new funclets.

Thus, the seed operation 350, the accumulate operation 352, and the place global data blocks operation 354 define funclets that cumulatively include all procedure blocks and all data blocks. The funclets are preferably not actually created by the seed operation 350, the accumulate operation 352, and the place global data blocks operation 354. Rather, the seed operation 350, the accumulate operation 352, and the place global data blocks operation 354 create a list of the defined funclets. The generate skeleton operation 316 and the convert program to data operation 318, which are discussed in more detail below with reference to FIG. 11, use the list of defined funclets to create the actual funclets 34 and the application skeleton 20.

Figure 10:
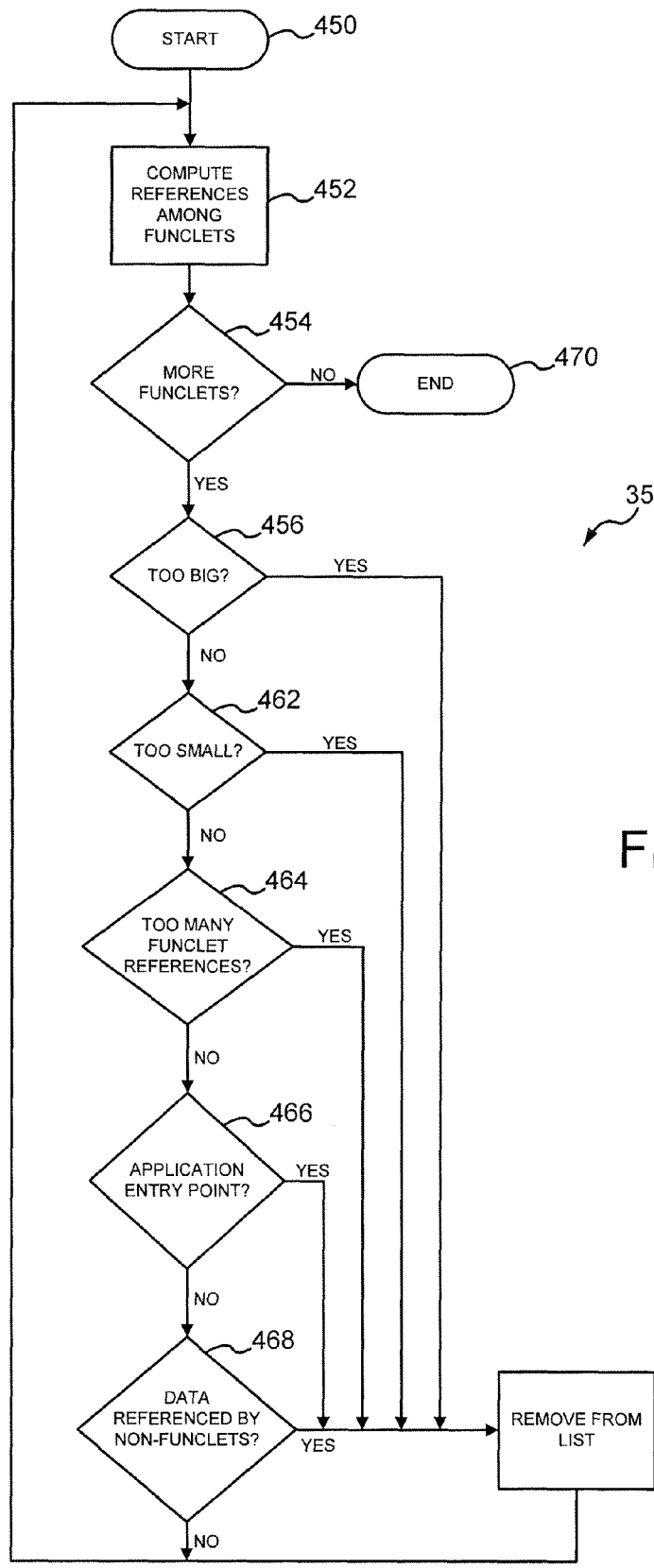
FIG. 10 illustrates the filter operation of FIG. 6 in more detail.

Referring now to FIG. 10, the filter operation 356 from FIG. 6 begins at a start operation 450. A compute references among funclets operation 452 computes the references between the defined funclets. A more funclets query operation 454 then determines whether any funclets remain to be processed by the filter operation 356. If funclets remain to be processed, then a too big query operation determines whether a particular unprocessed funclet is too big to be effectively compressed and downloaded. The actual maximum funclet size will depend on the particular application and on the particular download system characteristics. If the funclet is too big, then the remove from list operation 458 removes the funclet from the list of funclets. Thus, the data and/or code of the funclet will be included in the application skeleton 20.

If the too big query operation 456 determines that the funclet is not too big, then a too small query operation 462 determines whether the funclet is too small for the benefits of the funclet to outweigh the drawbacks of including the funclet. The benefits of including a small funclet may be minimal because of its size. Thus the benefits may be outweighed by the drawbacks, which include the time to process requests for the funclet and to download the funclet during use. The optimum actual minimum funclet size will depend on the particular application and the download system characteristics. If the funclet is too small, then the remove from list operation 458 removes the funclet from the list of funclets. Thus, the too big query operation 456 and the too small query operation 462 together assure that each funclet is within a predetermined funclet size range.

If the too small query operation 462 determines that the funclet is not too small, then the too many funclet references query operation 464 determines whether the funclet includes so many references to other funclets that the drawbacks of processing those references and the fix-ups described below outweigh the benefits of including the funclet. Again, the maximum number of references to other funclets will depend on the particular application and the download system characteristics. It may also depend on the benefits of including the funclet, which could depend on the characteristics of the particular funclet, such as the size of the funclet. If the too many funclet references query operation 464 determines that the funclet has too may references to other funclets, then the remove from list operation 458 removes the funclet from the list of funclets.

If the too many funclet references query operation 464 determines that the funclet does not include too many references to other funclets, then an application entry point query operation 466 determines whether the funclet includes the entry point for the entire application. The entry point for the entire application is preferably included in the application skeleton 20, not in a funclet. Thus, if the funclet includes the entry point for the entire application, the remove from list query operation 458 removes the funclet from the list of funclets.

If the application entry point query operation 466 determines that the funclet does not include the application entry point, then a data referenced by non-funclets query operation 468 determines whether the funclet includes data that is referenced by non-funclets. Such data and the defined funclets including such data are preferably included within the application skeleton 20. Thus, if the funclet includes data that is referenced by non-funclets, then the remove from list operation 458 removes the funclet from the list of funclets.

After the funclet is removed from the list of funclets by the remove from list operation 458 or the data referenced by non-funclets query operation 468 determines that the funclet does not include data referenced by non-funclets, then the compute references among funclets operation 452 again computes the references between the funclets and the more funclets query operation 454 determines whether more funclets remain to be filtered by the filter operation 356. After the filter operation 356 filters all the funclets, the more funclets query operation 454 determines that no funclets remain to be filtered and the filter operation 356 terminates at end operation 470.

Referring back to FIG. 6, the optimize flow within funclets operation 358 preferably arranges the code and data within the funclets according to the most favored path through the application as indicated by the profile data 310. Thus, blocks that are more likely to be encountered are grouped together within each funclet to improve performance of the funclet after it has been supplied to the application skeleton 20. This optimization may be performed in a manner similar to the optimization of procedures that have not been included in funclets.

Figure 11:
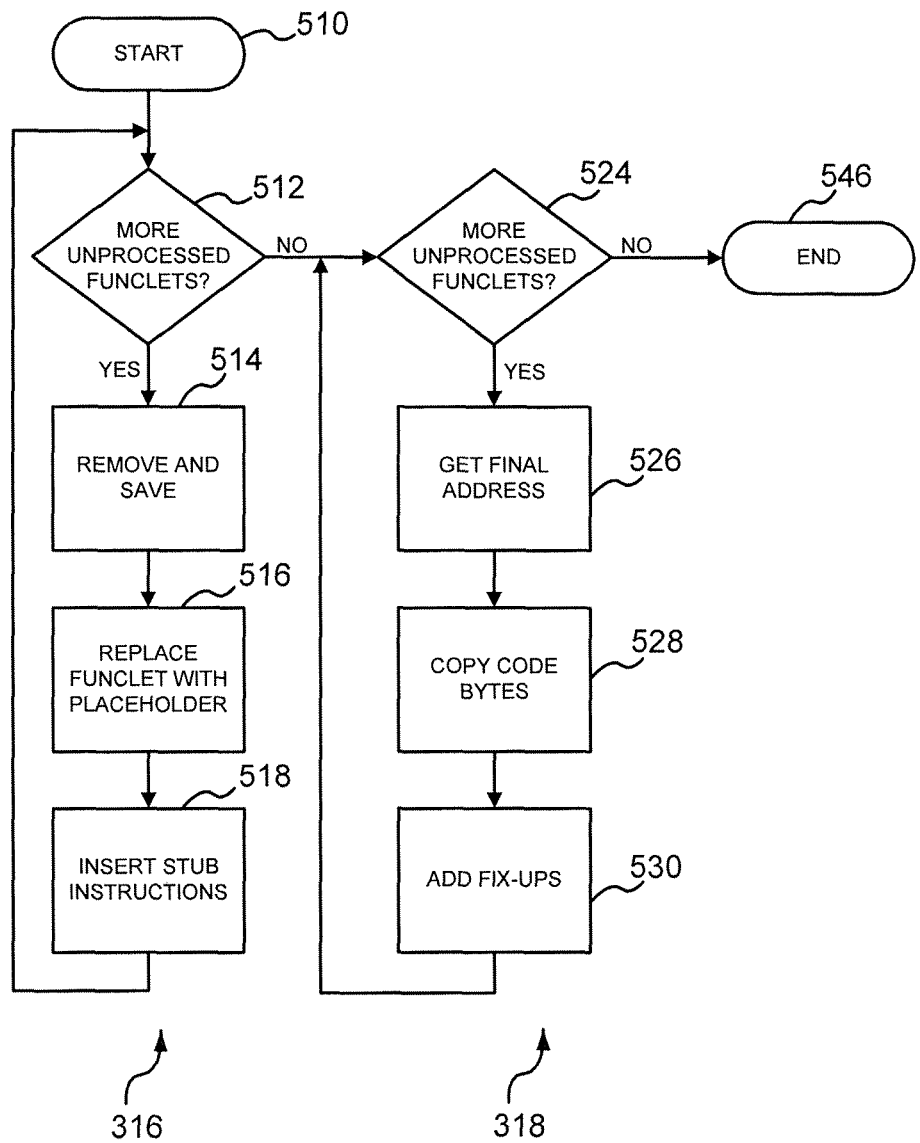
FIG. 11 illustrates the generate skeleton and convert program to data operations of FIG. 5 in more detail.

Referring now to FIG. 11, the generate skeleton operation 316 and the convert program to data operation 318 of FIG. 5 will be described in more detail. The generate skeleton operation 316 begins at start operation 510, and an unprocessed funclets query operation 512 determines whether more funclets remain to be processed by the generate skeleton operation 316.

If more funclets remain to be processed by the generate skeleton operation 316, then a remove and save operation 514 removes the funclet code and/or data from the original application 10 and saves a copy of the original funclet code and/or data. The replace funclet with placeholder operation 516 then reserves the space where the funclet code and/or data was removed, preferably by inserting zeros in that space. Finally, the insert stub instructions operation 518 inserts stub instructions that will call the LDRRT module to request the missing funclet when the stub instructions are encountered while running the application skeleton 20. The combined stub instructions and placeholder are referred to herein as a binary stub. The unprocessed funclets query operation 512 then determines whether more funclets remain to be processed by the generate skeleton operation 316. The generate skeleton operation 316 thus produces an application skeleton 320 that includes binary stubs in place of missing funclets.

After the generate skeleton operation 316 processes all the funclets, a more unprocessed funclets query operation 524 of the convert program to data operation 318 determines whether funclets remain to be processed by the convert program to data operation 318. If unprocessed funclets remain, then a get final address operation 526 gets the final address for the references from the funclet to other parts of the application, including references to other funclets. In so doing, the final address operation 526 must assure that each reference includes enough space or memory. For example, a jump command that only needs to go a short distance may need less space than a jump command that must go a longer distance. For example, in an x86 platform jump commands that need to jump short distances in memory typically only need to include 3 bytes, while jump commands that need to jump relatively long distances in memory typically require 5 bytes. Thus, in an x86 platform all jumps to other funclets preferably include 5 bytes because the other funclets may be located long distances from the referring jump command in memory. Likewise, jumps that must go long distances within funclets may also need to be 5 bytes. Of course, other platforms may require different numbers of bytes.

The copy code bytes operation 528 copies the funclet code and data bytes into the funclet. The funclet code and data bytes were previously saved by the remove and save operation 514 of the generate skeleton operation 316.

Figure 12:
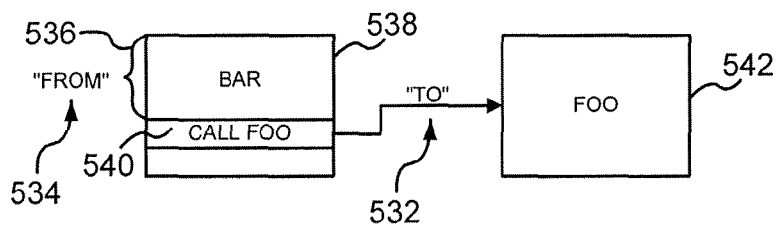
FIG. 12 illustrates the operation of "to" and "from" flags in accordance with an embodiment of the present invention.

An add fix-ups operation 530 adds fix-ups or relocations to the funclet. The add fix-ups operation 530 determines where to apply a relocation by determining where a reference within the funclet points to a target that will be modified by the binary preparation operation 12. The add fix-ups operation 530 also determines what the relocation is pointing to and what type of relocation is needed. Referring now to FIG. 12, the effects of two types of fix-ups, a "to" flag 532 and a "from" flag 534, are illustrated. In FIG. 12, the from flag 534 refers to the offset 536 between the beginning of a first funclet or "BAR" 538 and the referenced code 540. The to flag 532 includes a simple call to another funclet or "FOO" 542. Thus, the relocation may be a to flag such as 532 or a from flag such as 534. Note that in either case, the relocation or fix-up is needed because the referenced funclet will be in a different place in memory after being supplied to the application skeleton 20 than it would have been in the original application 10.

Referring back to FIG. 11, after the add fix-ups operation 530, the unprocessed funclets operation 524 determines whether more unprocessed funclets remain to be processed by the generate skeleton operation 318. After the generate skeleton operation 318 processes all the funclets, then the generate skeleton operation 318 terminates at end operation 546.

Figure 13:
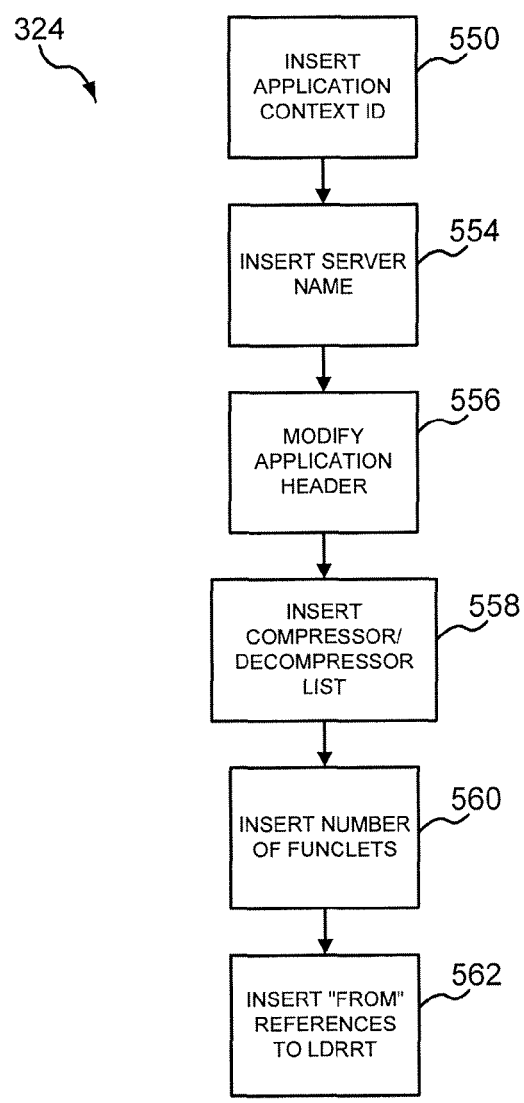
FIG. 13 illustrates the insert housekeeping structure operation of FIG. 5 in more detail.

Referring now to FIG. 13, the insert housekeeping structure operation 324 from FIG. 5 inserts several components into the application skeleton 20 that enable the application skeleton 20 to operate properly in a software on demand system. In insert application context id operation 550, an application context identification is placed in the application skeleton 20. Each funclet request from the application skeleton 20 will include the application context identification, which is used to match the request with the corresponding LDN 322. The application context identification and a funclet identification from the requesting binary stub enable the software on demand system to locate the requested funclet. Additionally, an insert server name operation 554 preferably includes a computer system identification of the computer system where the LDN 322 is stored to aid the software on demand system in locating requested funclets. The computer system identification is preferably the name of the server that includes the corresponding LDN 322.

A modify application header operation 556 modifies the application header of the application skeleton 20. A typical application header includes housekeeping information that is supplied to the operating system. When an application is started, the application header typically gives the operating system the entry point for the application and the operating system gives control to the application. The header of the application skeleton 20 is modified so that each time the application skeleton 20 executes, the application calls the corresponding LDRRT module and allows the LDRRT module to initialize before going to the original application entry point.

An insert compressor/decompressor list operation 558 places in the application skeleton 20 a list of the compressors used to compress each funclet and the corresponding decompressors that should be used to decompress each funclet. The compressor/decompressor pair list is especially important where multiple compressors are used to compress the funclets. This may be done where different funclets can be more effectively compressed using different compressors. The list allows each funclet to be decompressed by the decompressor corresponding to the compressor used to compress the funclet.

In insert number of funclets operation 560, the number of funclets 34 is placed in the application skeleton 20. This number may be used by the LDRRT module to produce an optimum configuration during initialization. Additionally, an insert "from" references to LDRRT operation 562 includes in the application skeleton the offset distance from the beginning of the LDRRT module to the referenced code or data within the LDRRT module for all references. Such "from" references enable the references to properly point to the desired code or data with the LDRRT module, even if the LDRRT module is loaded into different places in memory with each use of the LDRRT module.

While the invention has been particularly shown and described with reference to preferred embodiments thereof, it will be understood by those skilled in the art that various other changes in the form and details may be made therein without departing from the spirit and scope of the invention.

What is claimed is:

1. A method of preparing a computer program for operation in a computer supply system that supplies portions of program code or program data of the computer program, from a server to a client, as the program needs the portions, the portions identified as program units, the method comprising:
   receiving definition of a plurality of program units of the program at a computing system;
   removing, using the computing system, a plurality of program units, having one or more predetermined common characteristics, from the program, thereby producing a program skeleton that is missing at least two program units, each of the program units that is removed being operational code on the computing system, and each of the program units that is removed having a single entry point;
   maintaining one or more program units in the program skeleton required for initial execution of the program, the program skeleton being operable to be sent from the server to the client in less time than the program without removed program units, the program skeleton being operable to be initially executed as the program; and
   inserting instructions in place of at least one removed program unit in the program skeleton that was removed, the instructions providing the client with information to request the removed program unit from the server when the program skeleton encounters the instructions.

2. The method of claim 1, wherein the information includes an address of a server from which the client can retrieve the removed program unit.

3. The method of claim 1, wherein defining the program units further comprises defining procedure or data blocks of the program.

4. The method of claim 1, wherein defining the program units further comprises defining one of the program units as a first block if either the first block of the program is a call target of a procedure outside the first block or the first block is directly referenced from outside a parent procedure of the first block.

5. The method of claim 1, wherein each of the program units have multiple exit points.

6. The method of claim 1, further comprising replacing at least one of the at least two program units with a placeholder.

7. The method of claim 1, wherein each of the program units have a single exit point.

8. In a computing system having a client and a server, a method of preparing a computer application for operation in the computer supply system that supplies funclets of the computer application, from the server to the client, as the application needs the funclets, the method comprising:
   defining one or more funclets of the application, each funclet comprising a single funclet entry and at least one funclet exit, and including at least one other predetermined requirement including being smaller than a predetermined size, being larger than a predetermined size, including a natural data group, including an alphanumeric structure, including an array, having fewer than a predetermined number of references, or having more than a predetermined number of references;
   maintaining one of the funclets as a first procedure block of the application if:
      the first procedure block comprises a call target of a procedure outside the first procedure block;
      the first procedure block is directly referenced from outside a parent procedure of the first procedure block;
      the first procedure block is dynamically live and is referenced by a dynamically dead block; or the first procedure block is dynamically dead and is referenced by a dynamically live block;
   removing one or more funclets having a predetermined requirement of a single funclet entry, from the application, thereby producing an application skeleton that is missing at least one funclet;
   maintaining one or more funclets in the program skeleton required for initial execution of the application, the program skeleton operable to be sent from the server to the client in less time than the program without removed funclets, the program skeleton operable to be initially executed as the application; and
   inserting one or more placeholders in place of one or more removed funclets in the program skeleton, the one or more placeholders providing information about one or more removed funclets including one or more instructions directing the client to an address of the server from which the client requests the one or more removed funclets.

9. The system of claim 8, wherein defining the program units further comprises defining one of the program units as a first block if either the first block of the program is a call target of a procedure outside the first block or the first block is directly referenced from outside a parent procedure of the first block.

10. The system of claim 8, wherein defining the program units further comprises defining procedure or data blocks of the program.

11. A method of executing a computer program, the program being supplied in portions of program code or program data, the portions identified as program units, the method comprising:
   receiving, by a computing system, a program skeleton from a server, the program skeleton missing at least two program units having at least one predetermined common characteristic and including one or more program units required for initial execution of the program, the program skeleton being operable to be sent in less time than the program without removed program units, each of the program units that is missing being operational code on the server;
   executing, by the computing system, the program skeleton;
   reviewing instructions that were inserted in place of at least one removed program unit in the program skeleton that was removed; and
   requesting the removed program unit from the server based on the instructions when the program skeleton encounters the instruction.

12. The method of claim 6, wherein the instructions include an address of a server from which the client can retrieve the removed program unit.

13. The method of claim 11, wherein the instructions include an address of a server from which the client can retrieve the removed program unit.

14. The method of claim 11, further comprising defining the program unit by defining a procedure or data blocks of the program.

15. The method of claim 11, further comprising defining the program unit by defining at least one program unit as a first block if the first block of the program is a call target of a procedure outside the first block or if the first block is directly referenced from outside a parent procedure of the first block.

16. The method of claim 11, wherein at least one of the program units have a single entry point and a single exit point.

17. The method of claim 11, wherein at least one of the program units have a single entry point and multiple exit points.

18. The method of claim 11, wherein at least one of the program units have multiple entry points and multiple exit points.

19. The method of claim 11, further comprising replacing at least one of the at least two program units with a placeholder.

20. The method of claim 19, wherein the placeholder comprises an identifier for at least one of the at least two program units.

* * * * *